(12) United States Patent
Desai et al.

(10) Patent No.: US 8,712,330 B2
(45) Date of Patent: Apr. 29, 2014

(54) METHOD AND SYSTEM FOR BLUETOOTH LOW POWER LINK LAYER CONNECTION SETUP

(75) Inventors: Prasanna Desai, Elfin Forest, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 524 days.

(21) Appl. No.: 12/483,958

(22) Filed: Jun. 12, 2009

(65) Prior Publication Data

US 2010/0317289 A1    Dec. 16, 2010

(51) Int. Cl.
| | |
|---|---|
| *H04B 1/00* | (2006.01) |
| *H04B 15/00* | (2006.01) |
| *H04B 17/00* | (2006.01) |
| *H04B 7/00* | (2006.01) |
| *H04B 7/185* | (2006.01) |

(52) U.S. Cl.
USPC ........ 455/63.1; 455/522; 455/67.11; 370/318

(58) Field of Classification Search
USPC ......... 455/41.2, 501, 522, 63.1, 67.11, 67.13, 455/69, 296; 370/318
See application file for complete search history.

(56) References Cited

U.S. PATENT DOCUMENTS

| | | | | |
|---|---|---|---|---|
| 6,567,459 | B1 * | 5/2003 | Hakkinen et al. | 375/132 |
| 7,424,268 | B2 * | 9/2008 | Diener et al. | 455/62 |
| 7,773,531 | B2 * | 8/2010 | Olgaard et al. | 370/241 |
| 8,160,634 | B1 * | 4/2012 | Vargantwar et al. | 455/522 |
| 8,265,583 | B1 * | 9/2012 | Venkataraman | 455/296 |
| 2002/0126704 | A1 * | 9/2002 | Cam et al. | 370/503 |
| 2002/0188723 | A1 * | 12/2002 | Choi et al. | 709/225 |
| 2004/0005898 | A1 * | 1/2004 | Kato et al. | 455/450 |
| 2004/0142696 | A1 * | 7/2004 | Saunders et al. | 455/450 |
| 2004/0218567 | A1 * | 11/2004 | Budka et al. | 370/332 |
| 2007/0049295 | A1 * | 3/2007 | Soliman et al. | 455/456.3 |
| 2009/0060006 | A1 * | 3/2009 | Liu et al. | 375/147 |
| 2009/0232042 | A1 * | 9/2009 | Kneckt et al. | 370/312 |
| 2010/0009632 | A1 * | 1/2010 | Ibrahim et al. | 455/41.2 |
| 2010/0183061 | A1 * | 7/2010 | Imahashi et al. | 375/222 |
| 2010/0302979 | A1 * | 12/2010 | Reunamaki | 370/311 |

* cited by examiner

*Primary Examiner* — Andrew Wendell
(74) *Attorney, Agent, or Firm* — Thomas |Horstemeyer, LLP (57) ABSTRACT

A mobile device such as a Bluetooth low energy (BLE) device detects out-of-band blocking signals and manages packet transmission in associated BLE link layer connections based on the detected out-of-band blocking signals. The BLE device is operable to measure out-of-band RSSI to detect out-of-band transmission interferences. The BLE device compares the measured out-of-band RSSI with an out-of-band energy profile such as a LTE energy profile or a WiMAX energy profile to determine the out-of-band blocking signals indicating cadence or periodic out-of-band traffic activities. A remote BLE deice (advertiser) aperiodically or periodically transmits an advertising packet to the BLE device for a specific link layer connection. If not connected within a determined time period, the remote BLE device (advertiser) reduces transmission power for transmitting the advertising packet. The BLE device receives the advertising packet and sends a connection request packet to the remote BLE device (advertiser).

19 Claims, 7 Drawing Sheets

METHOD AND SYSTEM FOR BLUETOOTH LOW POWER LINK LAYER CONNECTION SETUP

CROSS-REFERENCE TO RELATED APPLICATIONS/INCORPORATION BY REFERENCE

The above stated application is hereby incorporated herein by reference in its entirety.

FIELD OF THE INVENTION

Certain embodiments of the invention relate to signal processing for communication systems. More specifically, certain embodiments of the invention relate to a method and system for Bluetooth low power link layer connection setup.

BACKGROUND OF THE INVENTION

The Bluetooth low energy (BLE) is a specification that enables radio frequency communication operating within the globally accepted 2.4 GHz Industrial, Scientific & Medical (ISM) band. The BLE specification supports a physical layer bit rate of 1 Mbit/s over a range of 5 to 15 meters. The BLE wireless technology specification features two implementations, namely "dual-mode" and "single-mode". In the dual-mode implementation, BLE functionality is an add-on feature within traditional Bluetooth, sharing a great deal of existing functionality resulting in a minimal cost increase compared to existing Bluetooth enabled devices. The dual-mode implementation is targeted at mobile devices and personal computers. The single-mode implementation is power and cost optimized. The single-mode implementation features a lightweight Link Layer (LL) providing ultra-low power idle mode operation, simple device discovery and reliable point-to-multipoint data transfer with advanced power-save and encryption functionalities. The single-mode implementation is targeted at, for example, small, button-cell battery powered devices in, for example, sports and wellness, healthcare, entertainment and toys and mobile accessories product categories.

The BLE offers connectivity between mobile devices or personal computers, and small button-cell battery power devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for Bluetooth low power link layer connection setup, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Bluetooth low power link layer connection setup. In accordance with various exemplary embodiments of the invention, a mobile device, such as, for example, a BLE central device, may be operable to detect out-of-band blocking signals and manage packet transmission in associated BLE link layer connections to avoid out-of-band transmission interference (blocker) based on the detected out-of-band blocking signals. The BLE central device may be operable to measure received signal strength indicator (RSSI) in out-of-band channels in order to detect the out-of-band transmission interference (blocker) with respect to associated BLE band (in-band) communication. The BLE central device may be operable to compare the measured out-of-band RSSI with an out-of-band energy profile such as, for example, a cellular Long-Term Evolution (LTE) energy profile or a Worldwide Interoperability for Microwave Access (WiMAX) energy profile. The out-of-band blocking signals may be determined if the measured out-of-band RSSI matches the out-of-band energy profile. The determined out-of-band blocking signals may comprise cadence or periodic out-of-band traffic activities. A BLE advertising device such as a BLE peripheral device (advertiser) may be operable to aperiodically or periodically transmit an advertising packet to the BLE central device for a specific link layer connection. The BLE peripheral device (advertiser) may consider the BLE central device to be operating in a saturation mode when no connection request packet is received for setting up the specific link layer connection from the central device within a determined time period. The BLE peripheral device (advertiser) may be configured to reduce transmission power and may continue to aperiodically or periodically transmit the advertising packet using the reduced transmission power for the specific link layer connection. The BLE central device may be operable to receive the advertising packet in the reduced transmission power and send a connection request packet to the BLE peripheral device (advertiser) for setting up the specific link layer connection.

Figure 1:
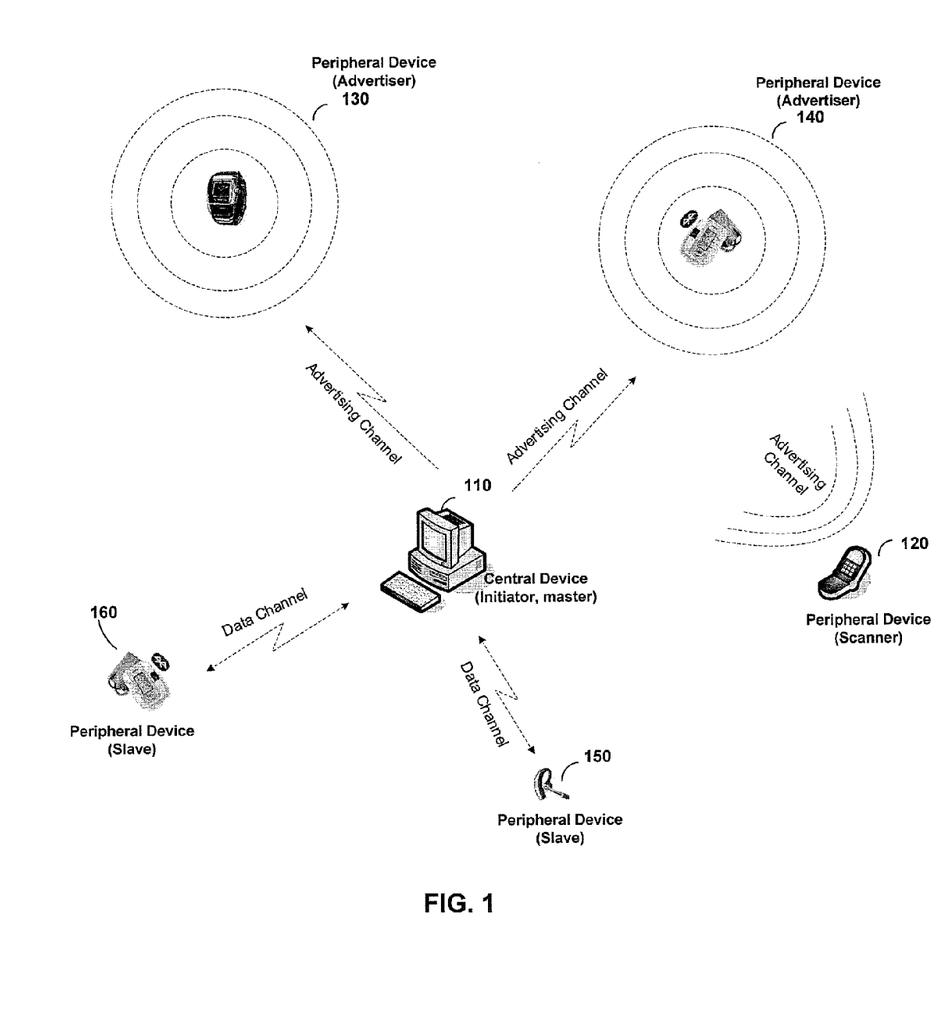
FIG. 1 is a diagram illustrating an exemplary Bluetooth Low Energy (BLE) communication system that is operable to determine transmission timing in a BLE link layer connection based on out-of-band blocking characteristics, in accordance with an embodiment of the invention.

FIG. 1 is a diagram illustrating an exemplary Bluetooth Low Energy (BLE) communication system that is operable to determine transmission timing in a BLE link layer connection based on out-of-band blocking characteristics, in accordance with an embodiment of the invention. Referring to FIG. 1, there is shown a Bluetooth low energy (BLE) communication system 100 comprising a central BLE device 110 and a plurality of peripheral BLE devices, of which peripheral BLE devices 120-160 are displayed.

The BLE communication system 100 may be operational to utilize a frequency division multiple access (FDMA) scheme and a time division multiple access (TDMA) scheme for voice and/or data communication. The communication system 100 may be configured to use a plurality of pre-divided physical channels. For example, in the communication system 100, 40 physical channels are pre-divided into advertising channels and data channels per FDMA scheme. The communication system 100 may be enabled to utilize a TDMA based polling scheme in link layer communications. Various BLE devices such as the central BLE device 110 and the plurality of peripheral BLE devices 120-160 in the BLE communication system 100 may play different roles in communication. In this regard, in advertising channels, a BLE device may play a role as an advertiser such as the peripheral devices 130-140, a scanner such as the peripheral device 120, or an initiator such as the central device 110. In data channels, a BLE device may play a role as a master such as the central device 110, or a slave such as the peripheral devices 150-160.

The central device 110 may comprise suitable logic, circuitry, interfaces and/or code that may be enabled to communicate with a plurality of peripheral slave devices such as the peripheral devices 120-160. The central device 110 may operate as an initiator to request establishment of a link layer connection with an intended advertiser such as the peripheral device 140. The central device 110 may be enabled to send a connection request packet such as a Connect_REQ packet to the intended advertiser to request setup of a link layer connection. The central device 110 may be operable to send the Connect_REQ packet in an advertising channel, in which the advertiser is advertising. The Connect_REQ packet may comprise unique link layer connection parameters such as, for example, hopping frequency length (Hop_length), which may be used to calculate a data channel index.

After the requested link layer connection is established, the central device 110 may become a master and the intended advertiser may become a slave for the established link layer connection. As a master, the central device 110 may be capable of supporting multiple link layer connections at a time to various slaves, for example, the peripheral devices 150-160 (slave). The central device 110 (master) may be operable to manage various aspects of data packet communication in a link layer connection with an associated slave such as the peripheral device 160 (slave). For example, the central device 110 may be operable to determine an operation schedule in the link layer connection with the peripheral device 160 (slave). The central device 110 may be operable to initiate a packet exchange sequence in the link layer connection with its own transmission. Link layer connections may be configured to run periodic connection events in data channels. Data packet transmissions may take place within connection events.

The central device 110 (master) may be operable to determine timing and duration for each connection event. In this regard, the central device 110 (master) may be configured to evaluate out-of-band blocking characteristics in order to ensure in-band (BLE 2.4 GHz) communication performance of the central device 110 (master). Out-of-band blocking may comprise undesired energy to the central device 110 (master) in a non-BLE band such as, for example, 2.5 GHz for Worldwide Interoperability for Microwave Access (WiMAX) or cellular Long-Term Evolution (LTE). The central device 110 (master) may be operable to determine out-of-band characteristics such as a WiMAX or LTE radio frame type utilized in out-of-band frequencies. The central device 110 (master) may be operable to evaluate received signal strength indicator (RSSI) of out-of-band radio signals for out-of-band characteristics. The central device 110 (master) may be configured to determine timing and duration for each connection event based on the determined out-of-band blocking characteristics. The timing and duration may be determined to avoid transmission interferences (blockers) between in-band (BLE band) and out-of-band (non-BLE band) communication.

During a connection event, data packets may be transmitted with, for example, 150 μs spacing and at least one data packet is communicated from the central device 110 (master) in the connection event. The central device 110 (master) may be configured to transmit the first data packet in each connection event to an intended slave such as the peripheral device 160 (slave). Transmission of the first data packet in each connection event may vary from 1.25 ms to 4.85 ms. The central device 110 may be enabled to utilize a TDMA based polling scheme to poll the intended slave for packet transmission in each connection event. The intended slave may transmit upon receiving a packet from the central device 110 (master). Input packets from the intended slave may be in a power level greater than a reference sensitivity limit but less than a maximal input level for a successful reception at the central device 110.

The reference sensitivity limit may be a minimal detectable input power level. To avoid transmission interference from, for example, out-of-band channels, the input packets from the intended slave may be at least in a power level such as, for example, 3 dB over the reference sensitivity level. On the other hand, a high input power level of the input packets may result in the central device 110 operating in a saturation mode and failing to demodulate the input packets. For example, as described in the BLE Controller Specification, a BLE device such as the central device 110 receiving packets with power levels greater than a Maximum Usable Level (MUL) of −10 dBm (with BER of <=0.1%) may enter into the saturation mode and fail to demodulate the received packets. In this regard, the central device 110 may be operable to enforce certain attenuation, for example, over 20 dB, at a corresponding radio front-end to receive the input packets properly.

An advertiser such as the peripheral device 140 may comprise suitable logic, circuitry, interfaces and/or code that may be enabled to broadcast advertisements aperiodically or periodically in an advertising channel. The peripheral device 140 (advertiser) may be configured to advertise service and availability for a link layer connection. The peripheral device 140 (advertiser) may be enabled to transmit advertising packets in advertising events. Advertising events may begin with the presence of an advertising packet sent by the peripheral device 140 (advertiser). The type of the advertising packet such as a connectable directed indication (ADV_DIRECT_IND) packet transmitted by the peripheral device 140 (advertiser) may determine the type of the advertising event such as a connectable directed event. The connectable directed event may be directed to a specific initiator such as the central device 110 (initiator). The central device 110 (initiator) may be enabled to initiate a link layer connection with the peripheral device 140 (advertiser) by sending a connection request (CONNECT_REQ) packet to the peripheral device 140 (advertiser) in the same advertising channel where the ADV_DIRECT_IND packet received.

After sending out each ADV_DIRECT_IND packet, the peripheral device 140 (advertiser) may be enabled to listen for CONNECT_REQ packets on the same advertising channel. In instances where no CONNECT_REQ packet may be received from the specific initiator such as the central device 110 (initiator) after a certain time interval, the peripheral device 140 (advertiser) may consider that the specific initiator such as the central device 110 (initiator) may operate in a saturation mode. In this regard, the peripheral device 140 (advertiser) may be enabled to retransmit the ADV_DIRECT_IND packet with a reduced transmission power. Upon receiving a CONNECT_REQ packet addressed to the peripheral device 140 (advertiser) from the central device 110 (initiator), the peripheral device 140 (advertiser) may be enabled to calculate a data channel index using hopping frequency length (Hop_length) in the received CONNECT_REQ packet. The peripheral device 140 (advertiser) may be enabled to move to a data channel with the data channel index to wait for data packets from the central device 110 (master). The peripheral device 140 (advertiser) may then be enabled to cease advertising in advertising channels. The peripheral device 140 may become a slave that may start operating in the determined data channel.

A scanner such as the peripheral device 120 may comprise suitable logic, circuitry, interfaces and/or code that may be operable to search for advertising BLE devices. The peripheral device 120 (scanner) may be enabled to discover information about available advertisers in a local area. The peripheral device 120 (scanner) may be operable to request more information from an advertiser such as the peripheral device 140 (advertiser) and pass this information as a scan report to an associated host device for further analysis. The peripheral device 120 (scanner) may be operable to use the information from received advertisement packets and pass this information as a scan report to the host device.

A slave device such as the peripheral device 160 may comprise suitable logic, circuitry, interfaces and/or code that may be operable to communicate with a master device such as the central device 110 (master) in an associated link layer connection. The peripheral device 160 (slave) may be associated with one link layer connection with the central device 110 (master). The peripheral device 160 (slave) may be operable to synchronize to connection event start points, called anchor points from a slave's perspective, for data communication with the central device 110 (master). The peripheral device 160 may consider that a link layer connection with the central device 110 (master) may be setup after receiving a connection request (CONNECT_REQ) packet from the central device 110 (master). The peripheral device 160 (slave) may be operable to calculate a data channel index using a channel selection algorithm for each connection event in an associated link layer connection. The data channel index may be determined based on, for example, a hopping frequency length (Hop_length) in the received CONNECT_REQ packet. The peripheral device 160 (slave) may be operable to move to a data channel with the calculated data channel index to communicate data packets with the central device 110 (master). The peripheral device 160 (slave) may be operable to transmit data packets in the data channel after receiving a data packet in the data channel from the central device 110 (master).

In an exemplary operation, the peripheral device 140 (advertiser) may be operable to transmit advertising packets such as connectable directed indication (ADV_DIRECT_IND) packets addressed to a specific initiator such as the central device 110 (initiator) for a link layer connection. The peripheral device 140 (advertiser) may be operable to listen for CONNECT_REQ packets from the central device 110 (initiator) on the same advertising channel after sending out each ADV_DIRECT_IND packet. In instances where no CONNECT_REQ packet may be received from the central device 110 (initiator) after a pre-determined time interval, the peripheral device 140 (advertiser) may be configured to retransmit the ADV_DIRECT_IND packet with a reduced transmission power to the central device 110 (initiator) for a link layer connection. Upon receiving a CONNECT_REQ packet addressed to the peripheral device 140 (advertiser) from the central device 110 (initiator), the peripheral device 140 (advertiser) may be operable to move to a data channel determined by the received CONNECT_REQ packet. In the data channel, the peripheral device 140 may operate as a slave just as the peripheral device 160 (slave) and the central device 110 may operate as a master. The central device 110 (master) may be operable to manage various aspects of communication in the data channel. In this regard, the central device 110 (master) may be configured to determine timing and duration for each connection event in the data channel. The central device 110 (master) may be operable to manage in-band (BLE) packet transmission in the data channel in a way to avoid transmission interference from, for example, out-of-band channels. The central device 110 (master) may be operable to evaluate RSSI of out-of-band radio signals for out-of-band blocking characteristics. The central device 110 (master) may be operable to manage in-band (BLE) packet transmission in the data channel based on the determined out-of-band blocking characteristics. The peripheral device 140 (slave) may be operable to synchronize to the determined packet transmission timing for data communication with the central device 110 (master).

Figure 2:
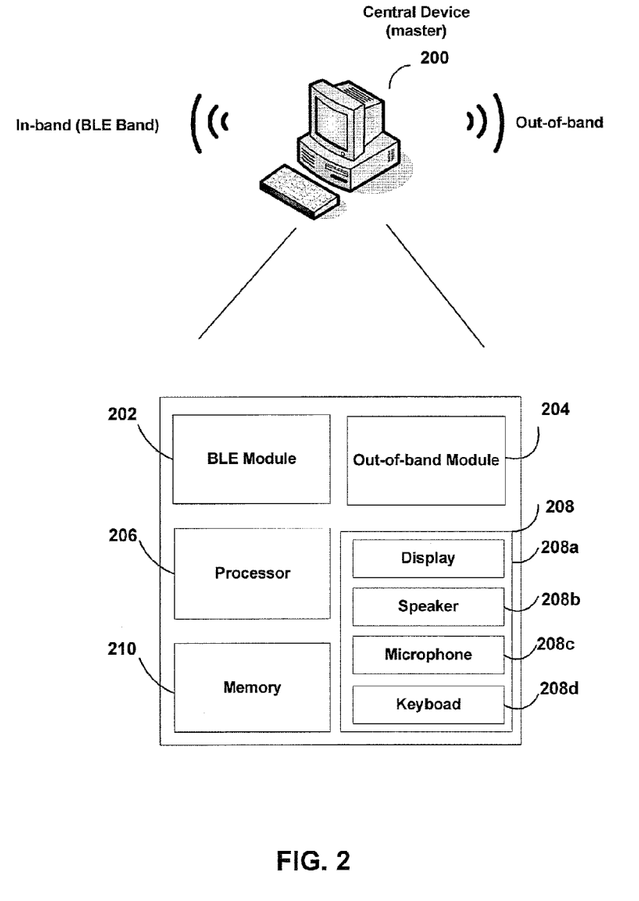
FIG. 2 is a diagram illustrating an exemplary Bluetooth Low Energy (BLE) master device that is operable to manage transmission timing in a BLE link layer connection based on out-of-band blocking characteristics, in accordance with an embodiment of the invention.

FIG. 2 is a diagram illustrating an exemplary Bluetooth Low Energy (BLE) master device that is operable to manage transmission timing in a BLE link layer connection based on out-of-band blocking characteristics, in accordance with an embodiment of the invention. Referring to FIG. 2, there is shown a central device 200 operating as a master in an associated link layer connection. The central device 200 (master) comprises a BLE module 202, an out-of-band module 204, a processor 206, a user interface 208, and a memory 210. The user interface 208 may comprise a display 208*a*, a speaker 208*b*, a microphone 208*c*, and a keyboard 208*d*.

The BLE module 202 may comprise suitable logic, circuitry, interfaces and/or code that may be operable to transmit and/or receive signals over Bluetooth low power air interface and communicate with the processor 206 for further processing.

The out-of-band module 204 may comprise suitable logic, circuitry, interfaces and/or code that may be operable to transmit and/or receive signals over, for example, wideband air interfaces such as WiMAX and LTE. The out-of-band module 204 may be operable to communicate the signals with the processor 206 for further processing.

The processor 206 may comprise suitable logic, circuitry, interfaces and/or code that may be operable to perform a variety of signal processing tasks associated with the BLE module 202 and/or the out-of-band module 204. The processor 206 may comprise controlling of the BLE module 202 as well as the out-of-band module 204. For example, the processor 206 may be operable to initiate a BLE link layer connection via the BLE module 202 with an advertiser. When connected, the processor 206 may be operable to initiate packet transmission in the BLE link layer connection with an intended slave such as the peripheral device 160 (slave). The processor 206 may be operable to schedule data packet communication with the peripheral device 160 (slave) in the BLE link layer connection.

The processor 206 may be operable to manage in-band (BLE) packet transmission in a way to avoid transmission interference from, for example, out-of-band channels. The processor 206 may be operable to evaluate RSSI of out-of-band radio signals to determine out-of-band blocking characteristics such as out-of-band blockers (interferences). The processor 206 may be operable to detect the presence of blockers from measured RSSI of out-of-band radio signals. The processor 206 may be operable to determine out-of-band blocking characteristics such as a certain cadence or periodicity of out-of-band radio signals like WiMax or LTE based on the measured out-of-band RSSI. The out-of-band blocking characteristics may be determined by comparing the measured out-of-band RSSI with certain out-of-band energy profiles such as, for example, LTE energy profile and WiMAX energy profile. The processor 206 may be operable to determine packet transmission timing and manage packet transmission in the BLE link layer connection based on the determined out-of-band blocking characteristics in order to avoid out-of-band interferences. The processor 206 may be operable to transmit data packets in the BLE link layer connection to the peripheral device 160 (slave) using the determined packet transmission timing. The peripheral device 160 (slave) may be operable to synchronize to the determined packet transmission timing for data packet transmission in the BLE link layer connection.

The user interface 208 may comprise suitable logic, circuitry, interfaces and/or code that may be operable to service the central device 200 (master) via entering user inputs and/or presenting various services to users. The user interface 208 may comprise a plurality of associated components such as the display 208a, the speaker 208b, the microphone 208c, and the keyboard 208d. The display 208a may be operable to present and/or display graphics and/or text to users. Services implemented via the BLE module 202 and/or the out-of-band module 204 may be presented to users as image data on the display 208a and/or as voice via the speaker 208b, for example, by pressing the keyboard 208d and/or generating an audio indication using the microphone 208c.

The memory 210 may comprise suitable logic, circuitry, interfaces and/or code that may be operable to store data and/or other information utilized by the processor 206. For example, the memory 210 may be utilized to store data communicated via the BLE module 202 and the out-of-band module 204. The memory 210 may be operable to store executable instructions for turning on or turning off out-of-band RSSI measurements. The memory 210 may be operable to store algorithms to calculate a RSSI and/or determine out-of-band packet transmission timing based on the out-of-band RSSI measurements and out-of-band energy profiles. The memory 210 may comprise RAM, ROM, low latency nonvolatile memory such as flash memory and/or other suitable electronic data storage capable of storing data and instructions.

Although the Bluetooth Low Energy (BLE) master device 200 is illustrated in FIG. 2, the invention may not be so limited. Accordingly, using out-of-band RSSI measurements to determine cadence or periodic traffic activities of corresponding out-of-band interferers may be applied to a mobile device supporting other communication technologies, for example, Bluetooth Basic Rate (BR)/Enhanced Data Rate (EDR) technology without departing from the spirit and scope of various embodiments of the invention.

In operation, the central device 200 may be operable to transmit and/or receive signals over Bluetooth low power air interface via the BLE module 202 and/or over, for example, a wideband air interface such as LTE or WiMAX via the out-of-band module 204. The processor 206 may be operable to control operations of the BLE module 202 as well as the out-of-band module 204. The processor 206 may be operable to perform out-of-band RSSI measurement in corresponding out-of-band channels. The out-of-band RSSI is a measurement of the received sideband signal strength at the central device 200. The processor 206 may be operable to determine activity periodicity of out-of-band interferers like WiMax or LTE to the Bluetooth ISM band using the out-of-band RSSI measurements. The activity periodicity of out-of-band interferers may be determined by matching the out-of-band RSSI measurements to corresponding out-of-band energy profiles such as LTE energy profile and/or WiMAX energy profile. The processor 206 may be operable to utilize the determined activity periodicity of out-of-band interferers to schedule traffic in a BLE link layer connection. For example, the processor 206 may be operable to determine transmission timing in the BLE link layer connection based on the determined activity periodicity of out-of-band interferers to reduce transmission interference levels in both Bluetooth ISM band and the corresponding out-of-band. Corresponding services implemented via the BLE module 202 and/or the out-of-band module 204 may be presented to users through the user interface 208.

Figure 3:
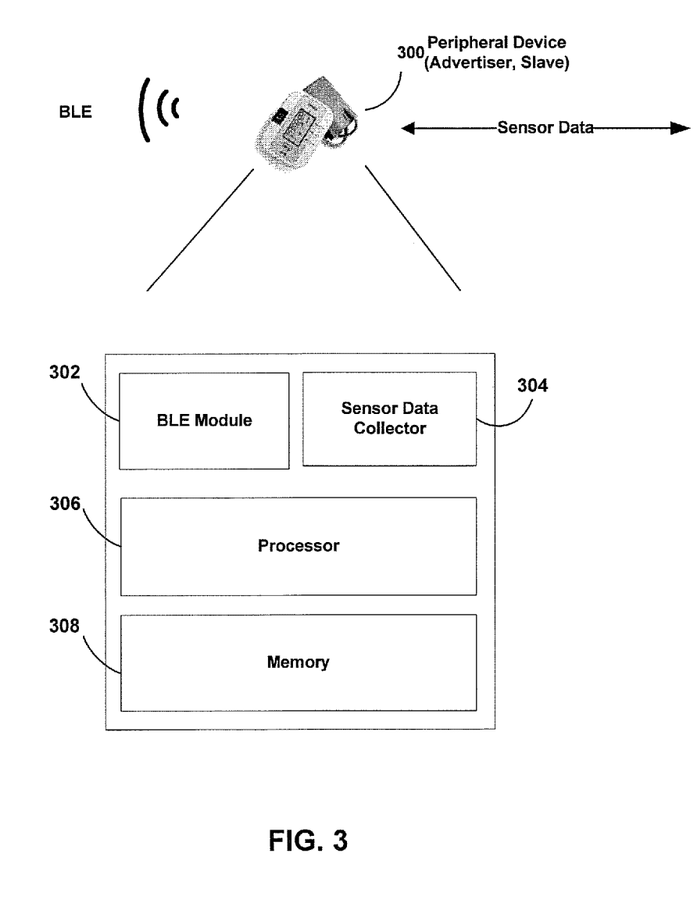
FIG. 3 is a diagram illustrating an exemplary Bluetooth Low Energy (BLE) advertiser that is operable to adjust transmission power for a fast BLE link layer setup, in accordance with an embodiment of the invention.

FIG. 3 is a diagram illustrating an exemplary Bluetooth Low Energy (BLE) advertiser that is operable to adjust transmission power for a fast BLE link layer setup, in accordance with an embodiment of the invention. Referring to FIG. 3, there is shown a peripheral device 300 operating as a BLE advertiser in advertising channels. The peripheral device 300 (advertiser) comprises a BLE module 302, a sensor data collector 304, a processor 306 and a memory 308.

The BLE module 302 may comprise suitable logic, circuitry, interfaces and/or code that may be operable to transmit and/or receive radio signals in advertising channels over BLE air interface and convert them to corresponding signals, which may be suitable for further processing in the processor 306.

The sensor data collector 304 may comprise suitable logic, circuitry, interfaces, and/or code that may be operable to collect sensor data from a target device. The collected sensor data may comprise, for example, running speed, body temperature, and/or blood pressure. The collected data may be communicated with various central devices such as the central device 110 (master) for further analysis.

The processor 306 may comprise suitable logic, circuitry, interfaces and/or code that may be operable to perform a variety of signal processing tasks and may comprise controlling of the BLE module 302 as well as the sensor data collector 304, for example. The processor 306 may be operable to transmit advertising packets aperiodically or periodically in an advertising channel. The processor 306 may be operable to advertise service and availability for a link layer connection. The processor 306 may be configured to transmit connectable directed indication (ADV_DIRECT_IND) packets addressed to a specific initiator such as the central device 110 for a link layer connection. The processor 306 may be configured to listen for connection request (CONNECT_REQ) packets on the same advertising channel after sending each ADV_DIRECT_IND packet. In instances where no CONNECT_REQ packet may be received from the central device 110 (initiator) after a pre-determined time interval, the processor 306 may be configured to reduce transmission power on the ADV_DI- RECT_IND packet and retransmit to the central device 110 (initiator) for a link layer connection.

Upon receiving a CONNECT_REQ packet addressed to the peripheral device 300 (advertiser) from the central device 110 (initiator), the processor 306 may be operable to move to a data channel indicated in the received CONNECT_REQ packet. The peripheral device 300 may operate as a slave and the central device 110 may operate as a master in the data channel. The processor 306 may be operable to synchronize to a packet transmission timing determined by the central device 300 (master) for data packet transmission. The processor 306 may be operable to transmit in the data channel upon receiving a packet from the central device 110 (master). The processor 306 of the peripheral device 300 (slave) may be operable to communicate sensor data collected via the sensor data collector 304 to the central device 110 (master) for further analysis.

The memory 308 may comprise suitable logic, circuitry, interfaces and/or code that may be operable to store data and/or other information utilized by the processor 306. For example, the memory 308 may be utilized to store collected sensor data from the sensor data collector 304. The memory 308 may be operable to store various algorithms for determining transmission power for BLE advertising packets. The memory 308 may be operable to store executable instructions for retransmitting ADV_DIRECT_IND packets with a reduced transmission power to a specific initiator such as the central device 110 (initiator) for a link layer connection. The memory 308 may comprise RAM, ROM, low latency non-volatile memory such as flash memory and/or other suitable electronic data storage capable of storing data and instructions.

In operation, the peripheral device 300 (advertiser) operating in BLE advertising channels may need to setup a link layer connection with a specific initiator such as the central device 110 (initiator). For example, the processor 306 may be operable to aperiodically or periodically transmit connectable directed indication (ADV_DIRECT_IND) packets in an advertising channel to the central device 110 (initiator) for a link layer connection. The processor 306 may be operable to listen for connection request (CONNECT_REQ) packets from the central device 110 (initiator) on the same advertising channel after sending each ADV_DIRECT_IND packet. In instances where no connection request from the central device 110 (initiator) within a predetermined time period may be received by the peripheral device 300 (advertiser), the processor 306 may be operable to reduce packet transmission power on the ADV_DIRECT_IND packet and retransmit to central device 110 (initiator) in an advertising channel. The level of transmission power reduction may be implementation dependent.

Upon receiving a CONNECT_REQ packet addressed to the peripheral device 300 (advertiser) from the central device 110 (initiator), the processor 306 may be operable to move to a data channel indicated in the received CONNECT_REQ packet. The peripheral device 300 may operate as a slave and the central device 110 may operate as a master in the data channel. The processor 306 may be operable to synchronize to a packet transmission timing determined by the central device 110 (master) for data packet transmission. The processor 306 may be operable to transmit in the data channel upon receiving a packet from the central device 110 (master). The processor 306 of the peripheral device 300 (slave) may be operable to communicate sensor data from the sensor data collector 304 to the central device 110 (master) for further analysis.

Figure 4:
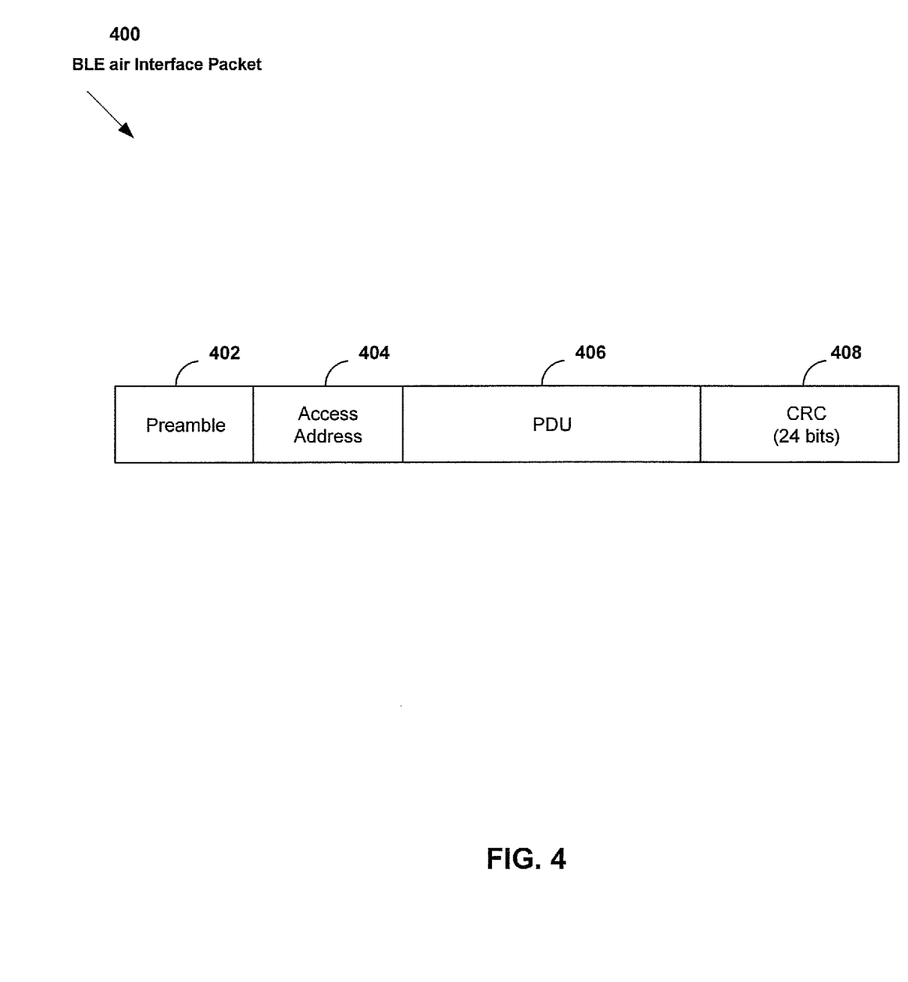
FIG. 4 is a diagram illustrating an exemplary Bluetooth Low Energy (BLE) air interface packet structure, in accordance with an embodiment of the invention.

FIG. 4 is a diagram illustrating an exemplary Bluetooth Low Energy (BLE) air interface packet structure, in accordance with an embodiment of the invention. Referring to FIG. 4, there is shown a BLE air interface packet 400 comprising a preamble 402, an access address 404, a Protocol Data Unit (PDU) 406, and a CRC 408.

The preamble 402 may comprise an eight bit long sequence of either '10101010' or '1010101'. The preamble 402 may be used in the receiver to perform frequency synchronization, symbol timing estimation, and gain control training. An advertising channel packet may use '01010101' as the preamble 402. The preamble 402 for a data channel packet may be either '10101010' or '01010101'.

The access address 404 may comprise a 32-bit value. The access address 404 may be '01101011011111011001000101110001' for an advertising channel packet. The access address 404 in data channel packets may be unique for each link layer connection between two BLE devices. The access address 404 in data channel packets may comprise a pseudo-random 32-bit value, generated by an initiator of corresponding link layer connection. The access address 404 may be different for each link layer connection currently active.

The PDU 406 may comprise actual data and/or control information in a Protocol Data Unit (PDU) from higher layers such as, for example, a 48-bit device address. The PDU 406 may be in a variable size ranging from 2 to a maximum of 39 octets. The leftmost bit may be transmitted first.

The cyclic redundancy check (CRC) 408 may be appended to the PDU 406 to allow integrity verification and a packet retransmission mechanism. The CRC 408 may be calculated on the PDU 406. The CRC 408 may be utilized as a measure of determining if the PDU 406 may need to be retransmitted. For example, upon the reception of the BLE air interface packet 400, a local CRC may be calculated on the PDU 406. The local CRC may be compared to the CRC 408 in the BLE air interface packet 400. A mismatch between the local CRC and the CRC 408 may lead to a CRC error. Two consecutive packets received with CRC error within an event may cause corresponding connection event closed.

In an exemplary operation, the BLE air interface packet 400 may represent an advertising packet. The preamble 402 comprises '01010101'. The access address 404 may comprise '01101011011111011001000101110001'. The BLE air interface packet 400 may be transmitted aperiodically or periodically in an advertising channel by an advertiser such as the peripheral device 140 (advertiser) for a link layer connection. The peripheral device 140 (advertiser) may be configured to transmit the BLE air interface packet 400 for a link layer connection with a specific initiator such as the central device 110 (initiator). In this regard, the PDU 406 may comprise information such as, for example, a 48-bit advertiser's device address and a 48-bit initiator's device address. If no link layer connection request is received by the peripheral device 140 (advertiser) within a predetermined time interval from the addressed initiator (the central device 110), the peripheral device 140 (advertiser) may consider the addressed initiator (the central device 110) as operating in a saturation mode. In this regard, the BLE air interface packet 400 may be retransmitted with a reduced power level in an advertising channel for a link layer connection.

Figure 5:
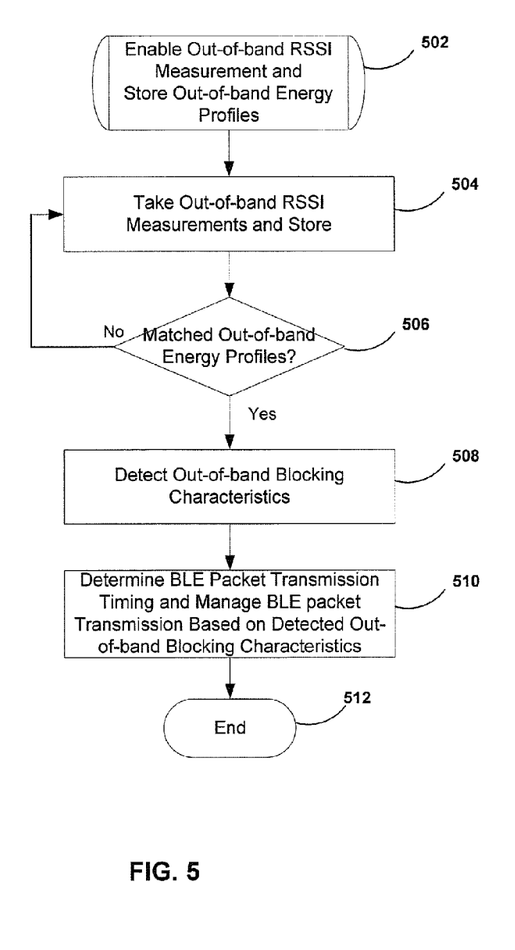
FIG. 5 is a diagram illustrating exemplary steps to determine transmission timing in a BLE link layer connection based on out-of-band blocking characteristics, in accordance with an embodiment of the invention.

FIG. 5 is a diagram illustrating exemplary steps for determining transmission timing in a BLE link layer connection based on out-of-band blocking characteristics, in accordance with an embodiment of the invention. Referring to FIG. 5, the exemplary steps start with step 502, where the central device 110 may enable RSSI measurements for out-of-band radio signals received via the out-of-band module 204. Out-of-band energy profiles such as LTE energy profile and WiMAX energy profile may be stored in the memory 210. In step 504, out-of-band RSSI may be measured and stored in the memory 210. In step 506, it may be determined that the out-of-band RSSI measurements may match the stored out-of-band energy profiles. In instances where the out-of-band RSSI measurements match the stored out-of-band energy profile, then in step 508, the processor 206 may be operable to analyze out-of-band transmission activities from the out-of-band RSSI measurements with respect to the out-of-band energy profiles. The processor 206 may be operable to detect out-of-band blocking characteristics based on the out-of-band transmission activities. In step 510, the processor 206 may be operable to determine BLE connection event timing and manage BLE packet transmission based on the detected out-of-band blocking characteristics. The exemplary process stops in step 512.

In step 506, in instances where the out-of-band RSSI measurements do not match the stored out-of-band energy profiles, then the exemplary steps may return to the step 504.

Figure 6:
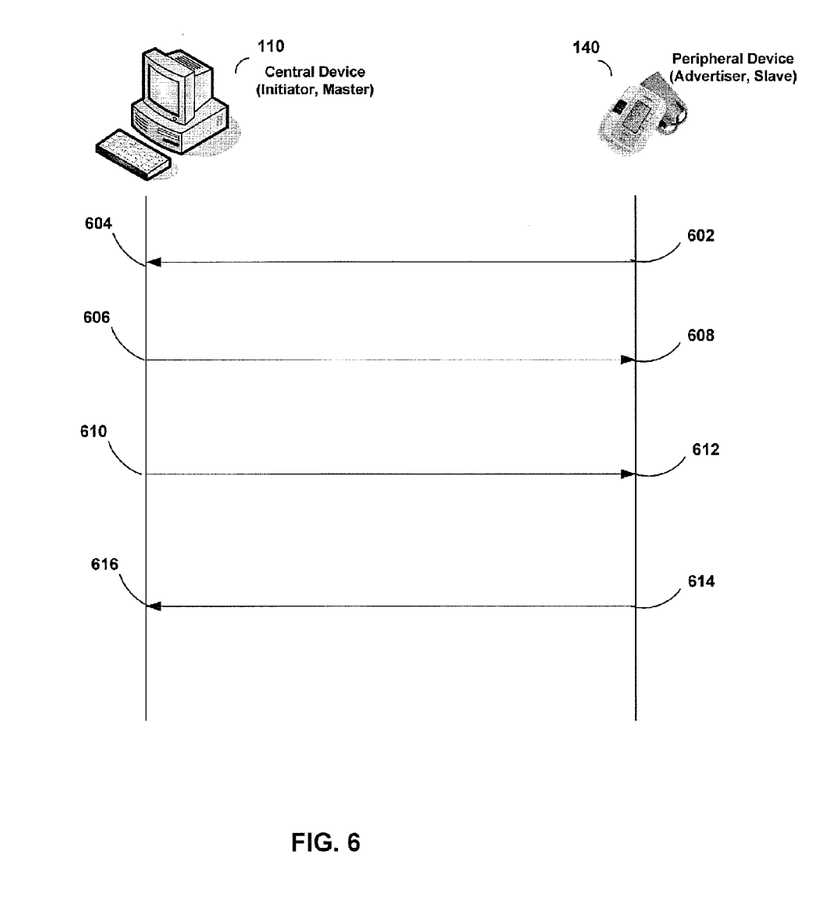
FIG. 6 is a flow chart illustrating exemplary steps for setting up a Bluetooth Low Energy (BLE) link layer connection using a transmission timing determined based on out-of-band blocking characteristics, in accordance with an embodiment of the invention.

FIG. 6 is a flow chart illustrating exemplary steps for setting up a Bluetooth Low Energy (BLE) link layer connection using a transmission timing determined based on out-of-band blocking characteristics, in accordance with an embodiment of the invention. Referring to FIG. 6, the exemplary steps start with step 602, where the peripheral device 140 (advertiser) may be operable to transmit, in an advertising channel, an advertising packet for a link layer connection. The preamble 402 comprises '01010101' and the access address 404 comprises '01101011011111011001000101110001' for the advertising packet, as described with respect to FIG. 4. After each advertising packet transmission, the peripheral device 140 (advertiser) may be operable to listen for a connection request on the same advertising channel. In step 604, the central device 110 (initiator) may be operable to receive the advertising packet from the peripheral device 140 (advertiser) in the advertising channel. In step 606, the central device 110 (initiator) may be operable to determine link layer connection specific parameters such as a link layer connection unique access address and a hopping frequency length (Hop_length) for a data channel on the unique link layer connection. The central device 110 (initiator) may be operable to create a connection request CONNECT_REQ packet addressed to the peripheral device 140 (advertiser). The CONNECT_REQ packet comprises determined link layer connection parameters. The central device 110 (initiator) may be operable to transmit the CONNECT_REQ packet to the peripheral device 140 (advertiser) in the advertising channel where the advertising packet is received from the peripheral device 140 (advertiser). The central device 110 may be operable to calculate a channel index using the determined Hop_length. The central device 110 may operate as a master in the data channel with the calculated index. In step 608, the peripheral device 140 (advertiser) may be operable to receive the CONNECT_REQ packet from the central device 110 (initiator). The peripheral device 140 may calculate a data channel index using hopping frequency length (Hop_length) in the received CONNECT_REQ packet. The peripheral device 140 may then be operable to cease advertising.

The peripheral device 140 may become a slave in a data channel with the calculated channel index. The peripheral device 140 (slave) may be operable to move to the data channel with the calculated channel index to wait for a first data packet in a connection event from the central device 110. In step 610, the central device 110 (master) may be operable to determine a connection event timing and a connection event interval for packet transmission in the link layer connection with the peripheral device 140 (slave). In this regard, the central device 110 (master) may be operable to determine the connection event timing and the connection event interval based on the out-of-band blocking characteristics as described with respect to FIG. 5. The central device 110 (master) may be operable to transmit the first data packet in the determined connection event to the peripheral device 140 (slave). In step 612, the peripheral device 140 (slave) may be operable to receive the first data packet in the connection event from the central device 110. The peripheral device 140 (slave) may synchronize to the connection event timing. In step 614, the peripheral device 140 (slave) may be operable to transmit data packets to the central device 110 (master) in the data channel with the calculated index after receiving a data packet from the central device 110 (master) in the data channel. In step 616, the central device 110 (master) may be operable to receive the data packets from the peripheral device 140 (slave) in the data channel with the calculated channel index.

Figure 7:
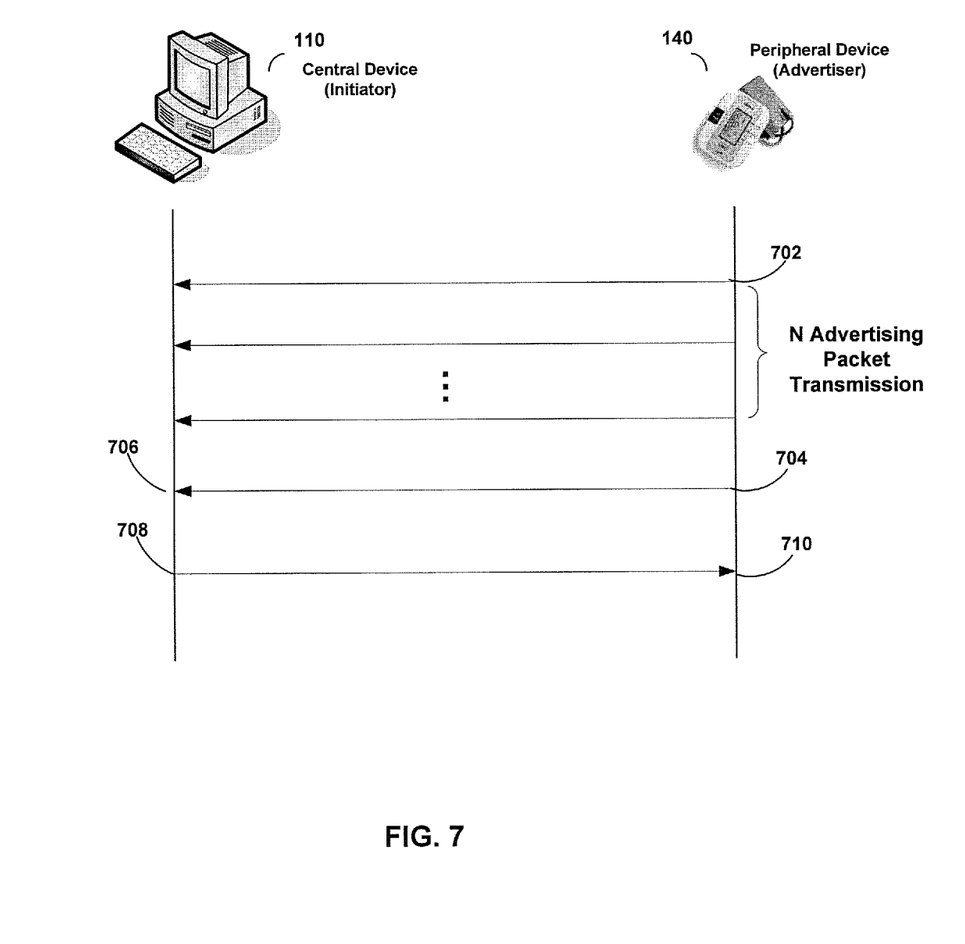
FIG. 7 is a flow chart illustrating exemplary steps for expediting a BLE link layer setup by adjusting transmission power of a Bluetooth Low Energy (BLE) advertiser, in accordance with an embodiment of the invention.

FIG. 7 is a flow chart illustrating exemplary steps exemplary steps for expediting a BLE link layer setup by adjusting transmission power of a Bluetooth Low Energy (BLE) advertiser, in accordance with an embodiment of the invention. Referring to FIG. 7, the exemplary steps start with step 702, where the peripheral device 140 (advertiser) may require setup of a link layer connection with a specific initiator such as the central device 110 (initiator). The peripheral device 140 (advertiser) may be operable to transmit, in an advertising channel, an advertising packet addressed to the central device 110 (initiator) for a link layer connection. The peripheral device 140 (advertiser) may be operable to aperiodically or periodically transmit, in the advertising channel, the advertising packet addressed to the central device 110 (initiator) if no connection request packet may be received from the central device 110 (initiator) in the same advertising channel. In step 704, after a determined time interval such as N advertising packet transmission without receiving a connection request from the central device 110 (initiator), the peripheral device 140 (advertiser) may reduce transmission power on the advertising packet and transmit to the central device 110 (initiator) in the advertising channel. In step 706, the central device 110 (initiator) may be operable to receive the advertising packet from the peripheral device 140 (advertiser) in the advertising channel. In step 708, the central device 110 (initiator) may be operable to determine link layer connection specific parameters such as a link layer connection unique access address and a hopping frequency length (Hop_length) for a data channel on the unique link layer connection. The central device 110 (initiator) may be operable to create a connection request CONNECT_REQ packet addressed to the peripheral device 140 (advertiser). The central device 110 (initiator) may be operable to transmit the CONNECT_REQ packet to the peripheral device 140 (advertiser) in the advertising channel where the advertising packet is received from the peripheral device 140 (advertiser). In step 710, the peripheral device 140 (advertiser) may be operable to receive the CONNECT_REQ packet from the central device 110 (initiator) in the advertising channel. The peripheral device 140 (advertiser) may consider that the setup of a link layer connection with the central device 110 (initiator) may be complete.

Aspects of a method and system for power Bluetooth low power link layer connection setup are provided. In accordance with various exemplary embodiments of the invention, as described with respect to FIG. 1, FIG. 2, FIG. 5 and FIG. 6, a mobile device such as the central device 110 may support various technologies such as Bluetooth BR/EDR and/or BLE. The central device 110 may be operable to detect out-of-band blocking signals and manage packet transmission in associated link layer connections to avoid out-of-band transmission interference based on the detected out-of-band blocking signals. For example, the central device 110 may be operable to determine packet transmission timing and schedule packet transmission in associated link layer connections based on the detected out-of-band blocking signals. The central device 110 may be operable to measure RSSI in one or more out-of-band channels in order to detect the out-of-band transmission interference with respect to associated in-band communication. The central device 110 may be operable to compare the out-of-band RSSI measurement with an out-of-band energy profile such as a LTE energy profile or a WiMAX energy profile. The out-of-band blocking signals may be determined when the out-of-band RSSI measurement matches the out-of-band energy profile. The determined out-of-band blocking signals may comprise out-of-band transmission interference information such as, for example, cadence or periodic out-of-band traffic activities of the determined out-of-band blocking signals. In the BLE communication 100, a BLE advertising device such as the peripheral device 140 (advertiser) may be operable to aperiodically or periodically transmit an advertising packet in an advertising channel to the central device 110 for a specific link layer connection. Referring to FIG. 2, FIG. 4, and FIG. 7, the peripheral device 140 (advertiser) may determine that the central device 110 may be operating in a saturation mode when the peripheral device 140 (advertiser) does not receive a connection request packet for setting up the specific link layer connection from the central device 110 within a determined time period. The peripheral device 140 (advertiser) may be operable to reduce transmission power and may continue to aperiodically or periodically transmit the advertising packet using the reduced transmission power for the specific link layer connection. The central device 110 may be operable to receive the advertising packet in the reduced transmission power and send a connection request packet to the peripheral device 140 (advertiser) for setting up the specific link layer connection. The peripheral device 140 (advertiser) may determine that the setup of the specific link layer connection with the central device 110 may be complete.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for Bluetooth low power link layer connection setup.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing a plurality of signals, the method comprising:
   performing by circuitry in a mobile device:
      detecting an out-of-band blocking signal;
      determining at least one of a cadence or a periodicity of said out-of-band blocking signal based on a measured received signal strength indicator (RSSI); and
      managing a packet transmission duration for an associated link layer in-band connection based on said at least one of said cadence or said periodicity for said out-of-band blocking signal that was determined.

2. The method according to claim 1, wherein said detecting comprises measuring said RSSI in an out-of-band channel.

3. The method according to claim 2, wherein said detecting comprises comparing said RSSI with an out-of-band energy profile, wherein said out-of-band energy profile comprises a cellular Long-Term Evolution (LTE) energy profile or a Worldwide Interoperability for Microwave Access (WiMAX) energy profile.

4. The method according to claim 3, comprising determining said out-of-band blocking signal based on said comparing.

5. The method according to claim 1, wherein said mobile device supports a Bluetooth low energy (BLE) technology, a Bluetooth Basic Rate (BR)/Enhanced Data Rate (EDR) technology, or both.

6. The method according to claim 5, comprising receiving using said mobile device a first advertising packet transmitted by a BLE advertising device for a specific link layer connection.

7. The method according to claim 6, comprising receiving a second advertising packet transmitted by said BLE advertising device and corresponding to a reduced transmission power relative to a transmission power corresponding to said first advertising packet.

8. The method according to claim 7, comprising setting up said specific link layer connection with said BLE advertising device subsequent to receiving said second advertising packet.

9. The method according to claim 4, further comprising managing a packet transmission timing for said associated link layer in-band connection based on said at least one of said cadence or said periodicity for said out-of-band blocking signal that was determined.

10. A system for processing a plurality of signals, the system comprising:
    circuitry for use in a Bluetooth low energy (BLE) mobile device, wherein said circuitry is operable to:
       detect an out-of-band blocking signal;

determine at least one of a cadence or a periodicity for said out-of-band blocking signal based on a measured received signal strength indicator (RSSI); and manage a packet transmission timing for an associated link layer in-band connection based on said at least one of said cadence or said periodicity for said out-of-band blocking signal that was determined.

11. The system according to claim 10, wherein said circuitry is operable to measure said RSSI in one or more out-of-band channels to detect said out-of-band blocking signal.

12. The system according to claim 11, wherein said circuitry is operable to compare said RSSI with an out-of-band energy profile to identify said out-of-band block signal, wherein said out-of-band energy profile comprises at least one of a cellular Long-Term Evolution (LTE) energy profile or a Worldwide Interoperability for Microwave Access (WiMAX) energy profile.

13. The system according to claim 12, wherein said circuitry is operable to determine said out-of-band blocking signal based on comparing said RSSI with said out-of-band energy profile.

14. The system according to claim 10, wherein said circuitry is operable to receive a first advertising packet transmitted at a first transmission power by a BLE advertising device for a specific link layer connection.

15. The system according to claim 14, wherein said circuitry is operable to receive a second advertising packet transmitted at a second transmission power by said BLE advertising device if said specific link layer connection is not set up within a determined time period, said second transmission power being lower relative to said first transmission power.

16. The system according to claim 15, wherein said circuitry is operable to set up said specific link layer connection with said BLE advertising device subsequent to receiving said second advertising packet.

17. The system according to claim 13, wherein said circuitry is operable to manage a packet transmission duration for said associated link layer in-band connection based on said at least one of said cadence or said periodicity for said out-of-band blocking signal that was determined.

18. An apparatus for processing signals, the apparatus comprising:

circuitry for use in a Bluetooth low energy (BLE) advertising device, wherein said circuitry is operable to:

transmit a first plurality of advertising packets to a BLE mobile device at a first transmission power to establish a specific link layer connection;

responsive to an absence of a connection request after transmitting said first plurality of advertising packets, transmit a subsequent plurality of advertising packets to said BLE mobile device at a reduced transmission power to establish said specific link layer connection; and move to a data channel responsive to receiving the connection request from said BLE mobile device after said transmission of said subsequent plurality of advertising packets.

19. The apparatus of claim 18, wherein said circuitry is operable to:

calculate a data channel index using a hopping length frequency in the connection request to enable the move to the data channel; and receive a plurality of data packets from the BLE mobile device using the data channel.

* * * * *